April 25, 1967 S. K. AMMANN 3,316,547

INTEGRATING ANALOG-TO-DIGITAL CONVERTER

Filed July 15, 1964 3 Sheets-Sheet 1

STEPHAN K. AMMANN
INVENTOR.

BY Roger S. Borovoy
ATTORNEY

STEPHAN K. AMMANN
INVENTOR.
BY Roger S. Borovoy
ATTORNEY

STEPHAN K. AMMANN
INVENTOR.
BY Roger S. Borovoy
ATTORNEY

United States Patent Office 3,316,547
Patented Apr. 25, 1967

3,316,547
INTEGRATING ANALOG-TO-DIGITAL CONVERTER

Stephan K. Ammann, Mountain View, Calif., assignor to Fairchild Camera and Instrument Corporation, Syosset, N.Y., a corporation of Delaware Filed July 15, 1964, Ser. No. 382,852
14 Claims. (Cl. 340—347)

The present invention relates to a system for taking the integral of an input signal over a given period of time and converting the time integral of the signal into digital form for display by digital indicators, application to a digital data processing system, or the like. The individual devices used in the system of the invention are relatively simple; therefore the system does not rely on components of extreme criticality, yet it is capable of providing a digital output which is accurately representative of the true time integral of an input signal, or the ratio of the integrals of two input signals even though the signals undergo reversals in polarity during the period of integration.

Various conventional integrating analog-to-digital converters, such as integrating digital voltmeters, provide a signal in digital form which is representative of the time integral of an input signal in analog form. The digital output of these prior devices is accurately representative of the true time integral of an input signal, provided the input signal is of relatively constant level, or at least does not change polarity during the integrating time interval. However, polarity changes in the input signal are generally inverted in the integration such that there is some departure in the digital output from a representation of the true integral. In addition, previous analog-to-digital converters of the integrating type have usually been relatively complex in their circuitry, and their accuracy has been to a large extent dependent upon various of the circuit parameters employed, particularly in the integrating circuit. The circuit design thus involves critical components having critical tolerances which must be carefully selected, and which are therefore quite costly.

Accordingly, among the objects of the present invention are to provide an integrating analog-to-digital converter: (1) capable of producing a digital output which is accurately representative of the true time integral of an input signal or of the ratio of two input signals, (2) whose digital output is substantially independent of circuit parameters of the converter circuit, and (3) which is substantially simpler in design and involves far less critical components than integrating analog-to-digital converters which have previously existed. In the accomplishment of these and other objects, the converter of the present invention generally includes means for generating a series of pulses of equal time separation for application to the input of pulse counter means arranged to produce a digital output representative of the number of pulses applied to its input over a given period of time. The application of the pulses to the input of the counter means is controlled by integrating means for generating an output signal proportional to the time integral of input signals applied thereto. Means are provided to apply a first input signal to be converted to digital form to the integrating means which at a given starting time proceeds to integrate the input signal and produce an output signal proportional to the resulting time integral. In response to the integrated signal having a first predetermined level, transmission of pulses from the pulse generating means to the input of the counter means is initiated whereupon the counter means is driven from a predetermined starting count to a full scale count in a first time interval beginning at the time the first integrated output signal is at the first predetermined level. During this first time interval required for the counter means to be driven to full scale, the integrated output signal varies from the first level to a second level. Means are provided to apply a second input signal to the integrating means with a polarity opposite to the first input signal and at a time corresponding to the termination of the first time interval, that is, in response to a full scale count of the counter means. Simultaneously, the first input signal is removed and the integrating means integrates the second input signal. Inasmuch as the second input signal is of the opposite polarity to the first input signal, the resulting integrated output signal of the integrating means varies in an opposite direction from the second level at which integration of the first signal was terminated—i.e., in the direction of the first predetermined level. After a second time interval immediately following the first time interval, the output signal of the integrating means returns to the first level. Means responsively coupled to the output of the integrating means then effect termination of the transmission of pulses from the pulse generating means to the input of the counter means in response to the termination of this second time interval. The digital output registered by the counter means is at this time accurately representative of the ratio of the integrals of the first and second input signals applied to the integrating means. Where the second input signal is a reference, the counter output represents the time integral of the first input signal with respect to the reference, whereas in the event the second input signal is other than a given reference, the output of the counter means represents the ratio of the integrals of two signals to be compared.

The invention will be better understood upon consideration of the following description of several embodiments of the invention in conjunction with the accompanying drawings, wherein.

Figure 1:
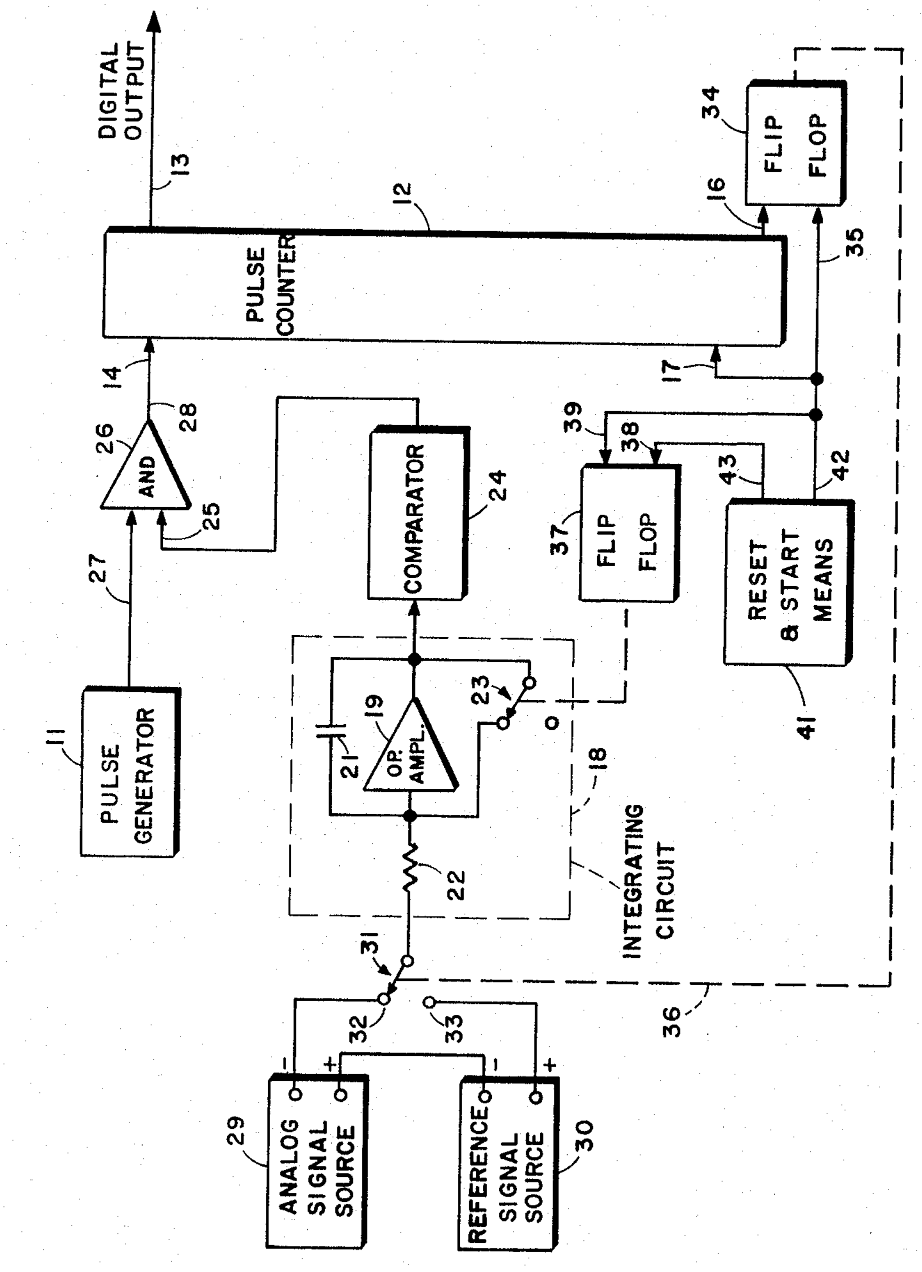
FIG. 1 is a block diagram of a preferred embodiment of an integrating analog-to-digital converter in accordance with the invention.

Referring now to FIG. 1, a preferred embodiment of an integrating analog-to-digital converter of the type briefly outlined hereinbefore will be seen to include a pulse generator 11, such as a free running multivibrator, free running blocking oscillator, or equivalent pulse generating means for generating a series of pulses having equal time separations. A pulse counter 12 of a generally conventional type is provided which produces a digital output, as generally indicated at 13, in the form of, for example, a visual display, electrical binary code decimal output, electrical binary output, or the like, representative of the number of pulses applied to its input 14 from the pulse generator 11. The pulse counter is further provided with a full scale output 16 at which a pulse is generated in response to a full scale count being registered at the digital output 13. The counter includes a reset input 17 which is arranged such that in response to the appearance of a pulse, the counter is set to zero, or another predetermined starting count.

Transmission of pulses from the pulse generator 11 to the input 14 of pulse counter 12 is controlled according to the integrated output of an integrating circuit 18 in a manner to be described in detail. The integrating circuit preferably comprises an operational amplifier 19 having a feedback capacitor 21 coupled between its output and input, and a resistor 22 in series with its input. It will be appreciated that the integrating circuit is conventional, so that an explanation of its operation is not needed since it is well known. Various alternative integrating means may as well be used in the converter of the present invention to provide an output signal which is proportional to the time integral of an input signal applied thereto over a given period of time. To facilitate ready control over the integrating time interval, the integrating circuit 18 is preferably provided with a switch 23, which may be either mechanical or electronic, connected in shunt with the capacitor 21. When the switch 23 is in its closed position, as depicted in FIG. 1, the capacitor 21 is shorted and the integrating circuit is thereby in a de-activated state such that no output is produced even though a signal is applied to its input. When the switch is in open position, however, the capacitor 21 is operatively associated with the amplifier and the integrating circuit is thus activated to generate an output signal representative of the time integral of an applied input signal.

Provision is made to initiate transmission of pulses from the pulse generator 11 to the input 14 of pulse counter 12 in response to the integrated output of the integrating circuit 18 being at a predetermined threshold level. Pulse transmission is sustained as long as the integrated output deviates from the threshold level in a given direction. Pulse transmission is terminated in response to the integrated output reversing direction and passing through this threshold level, return of the integrated output signal to the threshold level being effected by the application of a second or reference signal to the input of the integrating circuit with a polarity opposite that of the first input signal in a manner subsequently described. Various means may be employed to effect transmission of pulses during a time interval extending between successive times the output of the integrating circuit passes through a predetermined threshold level. For example, various comparators may be employed to generate abling and disabling pulses in response to successive traversals of a predetermined threshold by the integrated output. The abling and disabling pulses may then be utilized to control a keyed pulse generator employed as the generator 11.

Preferably, however, a level comparator 24 coupled to the output of the integrating circuit 18 is arranged to generate an output gate pulse which is initiated in response to the output signal of the integrating circuit passing through a predetermined threshold level in a given direction and which persists until such time as the integrated output signal passes through the threshold level in the opposite direction. The output of the comparator 24 is in turn connected to one input 25 of an AND-gate 26, a second input 27 of which is connected in receiving relation to the output of the pulse generator 11, and the output 28 of which is connected in energizing relation to the input 14 of pulse counter 12. The AND-gate 26 is open in response to a gate pulse from the comparator 24 and thus permits transmission of pulses from the pulse generator to the pulse counter input 14 for the duration of such gate pulse. In the absence of a gate pulse from the comparator, however, the gate is closed and, hence, the output pulses of the pulse generator are prevented from passing to the pulse counter input.

Means are provided to appropriately control the application of input signals to the input of the integrating circuit 18 so as to provide a digital output from the pulse counter 12 which is representative of the ratio of the time integrals of the input signals. More particularly, such means are arranged to apply a first signal to the integrating circuit followed by the application of a second signal of oppoiste polarity at a time the counter 12 registers a full scale output count. The first signal may be, for example, generated by an analog signal source 29, and the second signal, generated by a reference signal source 30. To these ends, a switch 31, which may be either mechanical or electronic, is preferably coupled to the input of the integrating circuit 18. The switch has contacts 32 and 33 respectively connected to opposite polarity terminals of the analog signal source 29 and reference signal source 30. For example, terminal 32 is connected to the negative terminal of analog source 29, while terminal 33 is connected to the positive terminal of reference source 30, as illustrated in FIG. 1, the positive and negative terminals of the analog and reference sources respectively being commonly connected to, for example, ground. In one position of the switch, the terminal 32 is connected to the input of the integrating circuit to thereby apply the signal from the analog source thereto, whereas in another position of the switch the terminal 33 is connected to the integrating circuit input to thereby apply the signal from the reference source with an opposite polarity to the analog signal. The switch 31 is preferably controlled by means of a flip-flop 34 having a set input connected to the full scale output 16 of the pulse counter 12 and a reset input 35 energized as described below. The output of the flip-flop is coupled in controlling relation to the switch 31, as indicated by the dashed line 36. In the reset state of the flip-flop which is effected in response to energization of the reset input 35, the switch 31 is responsively positioned to connect the terminal 32 to the integrating circuit input and thereby apply the signal from the analog source 29. In the set state of the flip-flop, which is effected responsive to a full scale indicating pulse being applied to the set input of the flip-flop from the full scale output 16 of the counter, switch 31 is positioned to connect the terminal 33 to the integrating circuit input and thereby to it the signal from reference source 30. Thus, the application of the reference signal to the input of the integrating circuit 18 is effected in response to a full scale output of the pulse counter 12.

In order that the converter properly function during subsequent cycles of operation, provision is made to periodically reset the converter prior to the initiation of each subsequent cycle of operation. It is necessary to reset the pulse counter 12 to a predetermined starting count, reset the switch 31 to its position connecting the terminal 32 to the input of the integrating circuit 18, and to reset the switch 23 to its closed position prior to the time another cycle of operation is initiated in response to opening of the switch 23. To accomplish this, a flip-flop 37 is preferably provided with its output coupled in controlling relation to the switch 23. The flip-flop has set and reset inputs 38 and 39, the respective energizations of which effect set and reset output states of flip-flop 37 which are consonant with the open and closed positions of the switch 23. Reset and start means 41 are then provided with a reset output 42 commonly connected to the reset input 17 of pulse counter 12, the reset input 35 of flip-flop 34, and the reset input 39 of the flip-flop 37. Means 41 are further provided with a start output 43 connected to the set input 38 of the flip-flop 37. The reset and start means 41 may be, for example, of the type convenitonally associated with digital readout apparatus, or the like, coupled to the digital output 13, to control associated equipment. Irrespective of the specific nature of the reset and start means 41, they are operable to periodically generate a pulse. The leading edge of this pulse may be employed for reset purposes and the trailing edge for starting. In response to the leading edge of the pulse, the reset input 17 of the counter 12, the reset input 35 of the flip-flop 34, and the reset input 39 of the flip-flop 37 are responsively energized to simultaneously (1) reset the pulse counter to a predetermined starting count, (2) actuate switch 31 to its position connecting terminal 32 to the integrating circuit input, and (3) actuate switch 23 to its closed position. A brief interval of time thereafter, in response to the trailing edge of the pulse, the reset and start means 41 energizes the set input 38 of flip-flop 37 which in turn actuates switch 23 to its open position, thereby initiating operation of the converter.

Figure 3:
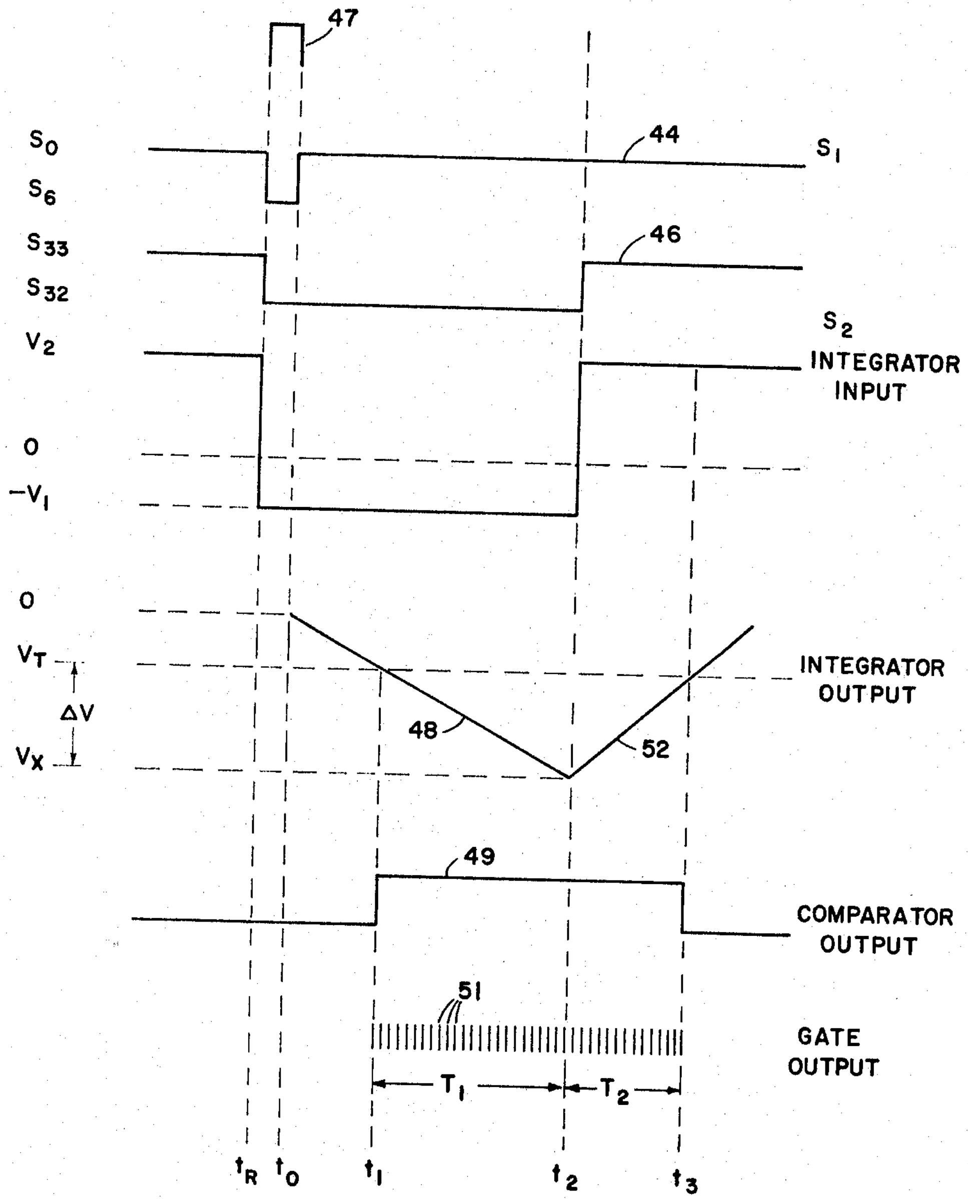
FIG. 3 is a graphical presentation of waveforms at various points of the circuit of FIG. 1.

Considering now the operation of the circuit of FIG. 1 in a specific case wherein analog signal source 29 applies a D.-C. signal of constant level $(+V_1)$ to the terminal 32 of switch 31, while reference signal source 30 applies a second D.-C. signal of opposite polarity and of a level $V_2$ to the terminal 33 of switch 31, reference is now made to FIG. 3 showing related waveforms existing at various points of the circuit under such input signal conditions. Waveform 44 designates the conditions of switch 23, while waveform 46 designates the condition of switch 31. Initially, switch 23 is in its open poistion $S_0$ and switch 31 is in its position $S_{33}$ wherein the switch terminal 33 is connected to the input of the integrating circuit 18. These initial switch conditions prevail upon completion of an operating cycle of the circuit prior to the time a reset pulse 47 is generated by the reset and start means 41. Upon the generation of such reset pulse 47, at a time $t_R$ (time of the leading edge of pulse 47) the reset input 17 of pulse counter 12, reset input 35 of flip-flop 34, and reset input 39 of flip-flop 37 are energized to thereby reset the circuit for a subsequent cycle of operation. The pulse counter is set to a predetermined start count, which in the present case will be taken as zero, while flip-flops 34 and 37 effect actuation of switches 31 and 23 to respectively their positions $S_{32}$ and $S_c$. In position $S_{32}$ of switch 31, terminal 32 is connected to the input of integrating circuit 18 to thereby apply the signal $(+V_1)$. $S_c$ denotes the closed position of switch 23 and, accordingly, at time $t_R$ the switch 23 shorts the capacitor 21 to thereby discharge some preparatory to the initiation of a subsequent cycle of integration. In response to the trailing edge of the pulse 47 at a time $t_0$ closely following the time $t_R$, the reset and start means energizes the set input 38 of flip-flop 37 which thereby effects actuation of switch 23 to its open positions $S_0$. Thus, at time $t_0$, the integrating circuit 18 is actuated, while the input signal $(+V_1)$ is applied to its input. The time integral of the input signal $(+V_1)$ is generated at the output of the integrating circuit, and in the present instance, is a ramp signal 48 having a slope of $$\left(-\frac{V_1}{RC}\right)$$

R being the resistance of resistor 22 and C being the capacitance of capacitor 21 of the integrating circuit 18. RC is the time constant $t$, in units of time, of the above ramp generator. At a time $t_1$, the ramp signal 48 passes through a predetermined threshold level $V_T$ of the comparator 24. As noted previously, the comparator generates an output gate pulse, designated as 49, in response to levels of the integrated signal at its input which surpass the threshold level in a given direction. The comparator output pulse 49 is thus initiated at the time $t_1$ whereupon the AND-gate 26 is opened. Thus, at time $t_1$ a series of pulses 51 from pulse generator 11 are transmitted through the AND-gate to the input 14 of pulse counter 12 and are thereby counted. After a period of time $T_1$ extending from time $t_1$ to a time $t_2$, the pulses 51 have driven the digital output 13 of the pulse counter to full scale, and a full scale indicating pulse is responsively applied from counter output 16 to the set input of flip-flop 34. Flip-flop 34 in turn actuates switch 31 to its position $S_{33}$ wherein the terminal 33 is connected to the input of the integrating circuit 18 to apply the signal $V_2$ from reference source 30 thereto. In response to the signal $V_2$ of opposite polarity to the signal $(+V_1)$, the time integral of signal $V_2$, in the present instance, a ramp 52, is generated at the output of the integrating circuit. The ramp signal 52 has a slope $V_2/RC$ of opposite polarity to the ramp signal 48. The ramp signal 52 accordingly varies from a level $V_x$, attained by the ramp signal 48 at the time $t_2$, to the predetermined threshold level $V_t$ at a time $t_3$. The gate pulse 49 from the comparator 24 is at this time terminated as is therefore the transmission of pulses 51 from the pulse generator 11 to the input 14 of the pulse counter. At this time the digital output 13 of the pulse counter registers a count of N pulses. These pulses have been registered in a time period $T_2$ extending from the time $t_2$ to the time $t_3$, inasmuch as at the time $t_2$ the counter has shifted from a full scale count to zero count..

It will be appreciated that the time period $T_1$ is related to the full scale count F of pulse counter 12 and the pulse repetition rate $f_0$ of the pulse generator 11 by the following: $T_1=F/f_0$. Similarly, the pulse count N is related to the time period $T_2$ and the pulse repetition rate $f_0$ by: $T_2=N/f_0$. In addition, the difference $\Delta V$ between level $V_x$ and level $V_T$ is given by:

$$\Delta V=\frac{V_1T_1}{RC}$$

Upon substituting for $T_1$ $$\Delta V=\frac{V_1F}{RCf_0}$$

Similarly $$\Delta V=\frac{V_2T_2}{RC}$$

and upon re-arrangement of terms, $T_2$ is given by:

$$T_2=\frac{\Delta VRC}{V_2}$$

Upon substituting for $\Delta V$ in the foregoing expression $$T_2=\frac{V_1RCF}{V_2RCf_0}=\frac{V_1F}{V_2f_0}$$

Equating the foregoing expresisons for $T_2$, there is obtained:

$$\frac{V_1F}{V_2f_0}=\frac{N}{f_0}$$

Multiplying both sides of the equation by $f_0$, N is accordingly expressed by:

$$N=\frac{V_1}{V_2}F$$

Thus, the count N registered in the digital output 13 of the pulse counter 12 is representative of the ratio of the input signals $V_1$ and $V_2$, as well as to the ratio of the time integrals of these signals $V_1/t$ and $V_2/t$. It is of importance to note that the digital output N is independent of all parameters of the converter circuit including the resistance R and capacitance C of the integrating circuit 18 and the repetition rate $f_0$ of the pulse generator 11. Moreover, it can be readily shown that for input signals of forms other than constant level, the digital output count N of the pulse counter is still proportional to the ratio of the time integrals of the two signals and independent of the parameters of the converter circuit.

Although the reset starting count of the counter 12 was taken as being zero in the foregoing example, it should be noted that a predetermined starting count other than zero may be employed with certain disadvantages. More particularly, consider the case where the most significant digit of a decimal digital output 13 of the counter 12 may be either one or zero preceding the count of a number of increasingly less significant decimal digits, for example four decades, and the full scale count of the counter is hence 19,999, or in effect 20,000 upon the counter switching from full to zero count. Under these circumstances, it is advantageous to employ a starting count of half of the full scale count, rather than a starting count of zero, i.e., a starting count of 10,000 in the present case. With such arrangement, the over-all time required for an integrating cycle of operation is reduced inasmuch as the time period $T_1$ preceding the switching from one input signal to the other is cut in half. During the time interval $T_1$, the counter is driven through only half of its full scale count, rather than through the entire full scale count. The level at which the direction of the integrated output signal from integrating circuit 18 is reversed by switching from one input signal to the other is thus relatively less than the level it would attain in a period equal to twice the interval. As a result, the period of time, $T_2$, required for the integrated output signal to again pass through the threshold level $V_T$ is likewise reduced as is therefore the over-all integrating period of the circuit. A further advantage accrues from the employment of a starting count of half scale in that the over-all count N is immediately indicative of which of the input signal time integrals is the greatest. More particularly, if the most significant digit of the output count N is zero, the second applied input signal is larger than the first inasmuch as the integrating time interval $T_2$ of the second signal is less than the integrating time interval $T_1$ of the first. Less time is required for the integral of the second signal than is required for the integral of the first signal to vary between the same difference in levels. Conversely, where the most significant digit of the output count N is one, the second time interval $T_2$ is greater than the first time interval $T_1$ and the time integral of the first input signal is, hence, greater than the time integral of the second input signal.

Figure 2:
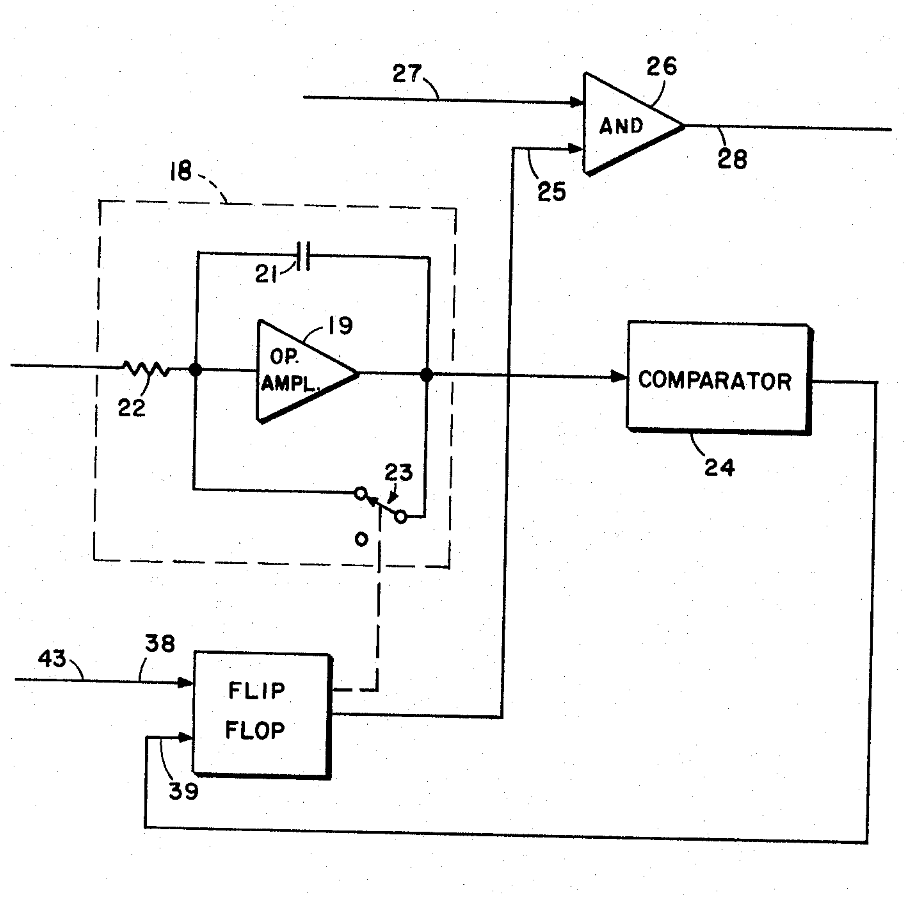
FIG. 2 is a fragmentary block diagram depicting a modification of the circuit of FIG. 1 which is particularly adapted for use with low level input signals.

It is to be noted that with the circuit of FIG. 1, the threshold level $V_t$ at which the transmission of pulses from the pulse generator 11 to the pulse counter 12 is initiated is different from zero. For most applications, this is advantageous inasmuch as it is extremely difficult to provide a comparator having a zero threshold level which does not drift during sustained use. However, in small input signal applications, the comparator may never respond to the time integral of a very small level input signal, or at least an impractically long time would be required for the conduct of an operating cycle. More particularly, with reference to FIG. 3, it will be appreciated that in the event the input signal of substantially constant level $V_1$ were of extremely low value, the resulting integrated ramp output signal would require an extremely long period of time to vary from zero level to the threshold level $V_t$. Accordingly, where the converter is to be employed with extremely small level input signals, the circuit of FIG. 1 is best modified in the manner illustrated in FIG. 2. In the modification of FIG. 2, similar elements employed in the circuit of FIG. 1 are referred to by like reference numerals. In the modified circuit, a comparator 24' is provided which is arranged to generate an output pulse in response to an input signal applied thereto passing through zero level. In other words, the comparator 24' is a zero level comparator. The output of integrating circuit 18 is coupled to the input of comparator 24' while the output thereof is coupled in triggering relation to the reset input 39 of flip-flop 37. The reset input of the flip-flop is thus no longer controlled by the reset and start means 41, although the set input 38 of the flip-flop is still connected to the start output 43 of the reset and start means. Likewise, flip-flop 37 is still coupled in controlling relation to the switch 23. However, the output of flip-flop 37 is now also coupled to the input 25 of AND-gate 26. Thus, in response to triggering of flip-flop 37 by the application of the trailing edge of a pulse generated by the reset and start means 41 to the set input 38 of the flip-flop, the switch 23 is opened to thereby actuate the integrating circuit 18. Simultaneously, the output of flip-flop 37 opens the AND-gate 26 and maintains the same open until the flip-flop is reset by the application of a pulse to its reset input 39. The transmission of pulses from pulse generator 11 to the counter 12 is thus initiated simultaneously with the time integral of an input signal being at zero level. Such initial zero level at the output of the integrating circuit 18 does not affect the comparator 24' since the signal does not pass through zero, but originates there. Thereafter, the operation of the modified circuit of FIG. 2 is the same as that previously described with reference to FIG. 1, the second input signal of opposite polarity being applied to the input of the integrating circuit in response to a full scale count of the pulse counter 12. When the time integral of the second input signal passes through zero level, the comparator 24' generates an output pulse which is in turn applied to the reset input 39 of flip-flop 37 to trigger same to its reset state. The AND-gate 26 is closed in response to this reset state of the flip-flop to in turn terminate the transmission of pulses from the pulse generator 11 to the pulse counter 12, and the count appearing at the digital output 13 at this time is thus representative of the ratio of the time integral of the two input signals. In addition, the reset state of the flip-flop actuates the switch 23 to its closed position, thereby de-activating the integrating circuit 18.

Although the invention has been described hereinbefore with respect to several preferred embodiments, it will be appreciated that various changes and modifications may be made therein without departing from the spirit and scope of the invention, and thus it is not intended to limit the invention except by the terms of the following claims.

What is claimed is:

1. An integrating analog-to-digital converter comprising pulse generating means for generating a series of pulses having equal time separation, pulse counter means for producing a digital output representative of a number of pulses applied to its input, integrating means for generating an output signal proportional to the time integral of an input signal applied thereto, means for applying a first input signal to said integrating means to produce a first integrated output signal, means responsively coupled to said integrating means for initiating transmission of pulses from said pulse generating means to the input of said counter means when said first integrated output signal has a first level, said counter means being driven from a predetermined starting count to a full scale count in a first time interval beginning at the time said first integrated output signal is at said first level, said first integrating output signal varying from said first level to a second level during said first time interval, means for applying a second input signal to said integrating means with a polarity opposite to said first input signal and at a time corresponding to the termination of said first time interval, said integrating means producing a second integrated output signal in response to said second input signal varying from said second level to said first level during a second time interval immediately following said first time interval, and means responsively coupled to said integrating means for terminating transmission of pulses from said pulse generating means to said counter means at the termination of said second time interval, whereby the digital output of said counter means at the termination of said second time interval is representative of the ratio of the integrals of said first and second input signals.

2. A converter according to claim 1, further defined by said predetermined starting count of said counter being a count halfway between zero count and a full scale count.

3. An integrating analog-to-digital converter comprising integrating means for generating upon actuation an output signal proportional to the integral of an input signal applied thereto, switch means having a first position for applying a first input signal to said integrating means and a second position for applying a second input signal to said integrating means with opposite polarity to said first input signal, said switch means normally in said first position, means for initiating actuation of said integrating means to thereby produce a first integrated output signal which has a predetermined level at a first time, pulse generating means for generating a series of pulses having equal time separations, pulse counter means for producing a digital output representative of a number of pulses applied to its input, said counter means having a preset starting count, means for initiating transmission of said pulses from said generating means to said counter means at said first time, means for switching said switch means from said first to said second position in response to a full scale count at the output of said counter means, said integrating means thereby producing a second integrated output signal which is at said predetermined level at a second time, means for terminating transmission of said pulses from said generating means to the input of said counter means at said second time, and means for resetting said counter means to said starting count, said switch means to said first position, and said integrating means to deactuated conditions prior to a subsequent actuation of said integrating means.

4. An integrating analog-to-digital converter comprising integrating means for generating an output signal proportional to the integral of an input signal applied thereto, switch means having a first position for applying a first input signal to said integrating means and a second position for applying a second input signal to said integrating means of opposite polarity to said first input signal, comparator means for generating an output signal only in response to the output signal of said integrating means having magnitudes exceeding a predetermined threshold level in a given direction, pulse counter means for producing a digital output representative of a number of pulses applied to its input, means generating a series of pulses having equal time separations, means applying said pulses to the input of said counter means only in response to said output signal from said comparator means, means for actuating said switch means between said first and second positions in response to a full-scale output of said counter means, and means for resetting said counter to a predetermined starting count subsequent to the termination of said output signal of said comparator means.

5. A converter according to claim 4, wherein said predetermined starting count is midway between zero count and the full scale count of said counter means.

6. An integrating analog-to-digital converter comprising pulse counter means for generating a digital output representative of a number of pulses applied to its input, said counter having a full scale count of F pulses, means generating a series of pulses at a rate of $f_0$ pulses per second, means for generating a first ramp voltage in response to a first input voltage $V_1$, said first ramp voltage having a slope of $V_1/t$, where $t$ in units of time is the time constant of said means for generating said first ramp, said first ramp voltage varying from a predetermined level $V_t$ to a level $V_x$ in a time interval $T_1$ given by:

$$T_1=\frac{F}{f_0}$$

said first ramp voltage thereby having a voltage variation $V_x-V_t$ during said time interval $T_1$ given by:

$$V_x-V_t=\frac{V_1T_1}{t}=V_1\frac{F-}{f_0t}$$

means for generating a second ramp voltage in response to a second input voltage $V_2$ of opposite polarity to input voltage $V_1$, said second ramp voltage having a slope of $V_2/t$ of opposite polarity to the slope of the first ramp voltage and varying from said level $V_x$ to said level $V_t$ in a time interval $T_2$ which is thereby given by:

$$T_2=\frac{(V_x-V_t)_t}{V_2}=\frac{V_1F}{V_2f_0}$$

means setting said pulse counter means to zero count prior to said first ramp voltage attaining said level $V_t$, and means transmitting said pulses to the input of said counter means only during a total time interval $T_1+T_2$, whereby during said interval $T_1$ said counter means receives F pulses and is driven to full scale and during the subsequent interval $T_2$ the counter means receives N pulses which are registered as the digital output for the total interval $T_1+T_2$, N being given by:

$$N=f_0T_2=\frac{V_1}{V_2}F$$

7. An analog-to-digital converter comprising a pulse counter having a digital output registering a number of pulses applied to its input, said counter having a full scale count of F pulses and a full scale output energized in response to F pulses being registered by said digital output, a pulse generator for generating pulses at a rate of $f_0$ pulses per second, integrator means for generating an output signal proportional to the time integral of an input signal applied thereto, switch means having a first position applying a first input signal $V_1$ to said integrator means and a second position applying a second input signal $V_2$ to said integrator means of opposite polarity to said signal $V_1$, means for actuating said integrator means while said switch means is in said first position, said integrator means upon actuation thereby generating an integrated output signal which varies from a level $V_t$ to a level $V_x$ in a time interval $T_1$ with the difference between said levels being given by:

$$V_x-V_t=\frac{V_1T_1}{t}$$

said integrator means upon actuation of said switch means to said second position at the termination of said time interval $T_1$ generating a second integrated output signal of opposite direction to the first integrated signal, said second integrated signal varying from said level $V_x$ to $V_t$ in a time interval $T_2$ initiated simultaneously with the termination of the interval $T_1$, said level difference $V_x-V_t$ being related to the input signal $V_2$ in accordance with:

$$V_x-V_t=\frac{V_2T_2}{t}$$

comparator means having an input threshold comparison level to $V_t$ and generating output pulses only in response to input signals in excess of said threshold level in a given direction, said comparator means responsively coupled to the output of said integrator means and thereby generating an output pulse of duration $T_1+T_2$ in response to said first and second integrated signals, means for effecting transmission of said pulse generator to the input of said counter only in response to and for the duration of said output pulse of said comparator means, means for actuating said switch means from said first to said second position thereof in response to energization of said full scale output, said time interval $T_1$ being thereby equal to $F/f_0$ and said time interval $T_2$ being equal to $$\frac{V_1F}{V_2f_0}$$

said counter receiving N pulses during said time interval $T_2$ and having a digital output registering N pulses for the total interval $T_1+T_2$ where N is given by:

$$N=T_2f_0=\frac{V_1}{V_2}F$$

and reset means for setting said counter to zero, actuating said switch means to its first position, and de-actuating said integrator means subsequent to said time interval $T_2$.

8. An analog-to-digital converter comprising an integrating circuit including an amplifier having a feedback capacitor between its input and output and a series resistance in its input, a switch connected in shunt with said capacitor having a closed position shorting said capacitor to disable said integrating circuit and an open position actuating same, first and second input terminals for receiving first and second input signals of opposite polarities, said second input signal being of greater magnitude than said first input signal, a second switch having a first normal position connecting said first terminal to the input of said amplifier and a second position connecting said second terminal to the input of said amplifier, a comparator coupled to the output of said amplifier, said comparator generating an output pulse in response to an output signal from said amplifier having a level exceeding a predetermined threshold level in a given direction, said output pulse of said comparator thereby having a duration extending from a time said output signal of said amplifier exceeds said threshold level in said given direction to a time the amplifier signal passes through the threshold level in the opposite direction, a pulse counter having a digital output representative of a number of pulses applied to its input, said counter having a full scale output for generating a full scale indicating pulse in response to a full scale reading of said digital output, said counter having a reset input for upon energization setting said counter to a predetermined starting count, a pulse generator for generating a series of pulses of equal time separation, means for effecting transmission of said pulses of said pulse generator to the input of said counter only in response to and for the duration of an output pulse of said comparator, a flip-flop having a reset input, a second input, and an output, said second input responsively coupled to said full scale output of said counter, said flip-flop output coupled in actuating relation to said second switch to actuate the switch to its second position in response to said full scale indicating pulse and to actuate the switch to its first position in response to energization of the rest input of the flip-flop, and reset means for energizing said reset inputs of said counter and flip-flop respectively and to actuate said first switch to its first position prior to actuation of the first switch to its second position.

9. A converter according to claim 8, further defined by said means for effecting transmission of said pulses of said pulse generator comprising an AND-gate having first and second inputs respectively connected to the outputs of said comparator and pulse generator and an output coupled to the input of said counter, said pulse generator being continuous operating.

10. An intergating analog-to-digital converter comprising integrating means for generating an output signal proportional to the integral of an input signal applied thereto, said integrating means including first switch means having first and second positions wherein the integrating means is respectively de-actuated and actuated, second switch means having a first position for applying a first input signal to said integrating means and a second position for applying a second input signal to said integrating means with an opposite polarity to that of said first input signal, said second switch means normally in its first position, pulse generating means for generating a series of pulses having equal time separations, pulse counter means for producing a digital output representative of a number of pulses applied to its input, said counter means having a preset starting count, means for simultaneously actuating said first switch means from its first to second position and initiating transmission of said pulses from said generating means to said counter means, means for actuating said second switch means from its first to second position in response to a full scale count at the output of said counter means, zero level comparator means coupled to the output of said integrating means for terminating transmission of said pulses from said generating means to said counter means and actuating said first switch means from its second to first position in response to the integrated output signal of the integrating means passing through zero level, and reset means for resetting said counter means to said starting count and actuating said second switch means from its second to first position subsequent to actuation of said first switch means to its first position.

11. A converter according to claim 10, wherein said starting count of said counter means is midway between a zero count and full scale count thereof.

12. An integrating analog-to-digital converter comprising integrating means for generating an output signal proportional to the integral of an input signal applied thereto, said integrating means including first switch means having first and second positions wherein the integrating means is respectively de-actuated and actuated, second switch means having a first position for applying a first input signal to said integrating means and a second position for applying a second input signal to said integrating means with an opposite polarity to that of said first input signal, said second switch means normally in its first position, pulse generating means for generating a series of pulses having equal time separations, pulse counter means for producing a digital output representative of a number of pulses applied to its input, said counter means having a preset starting count, an AND-gate having first and second inputs and an output, said first input connected in receiving relation to said pulse generating means and said output connected to the input of said counter means, a flip-flop having first and second inputs and an output, said output of said flip-flop connected to the second input of said AND-gate and to said first switch means, said flip-flop having a first output state effective to open said AND-gate and actuate said first switch means to said second position thereof and a second output state effective to close said AND-gate and to actuate said first switch means to said first position thereof, said flip-flop being triggered from said first state to said second state in response to a pulse at said first input thereof and being triggered from said second state to said first state in response to a pulse at said second input thereof, means for actuating said second switch means from its first to second position in response to a full scale count at the output of said counter means, zero level comparator means coupled to the output of said integrating means for generating an output pulse in response to the integrated output signal of the integrating means passing through zero level, said comparator means coupled in energizing relation to the second input of said flip-flop, and start-reset means for resetting said counter means to said starting count and actuating said second switch means from its second to first position and thereafter applying a pulse to the first input of said flip-flop.

13. An analog-to-digital converter comprising an integrating circuit including an amplifier having a feedback capacitor between its input and output and a series resistance in its input, a switch connected in shunt with said capacitor having a closed position shorting said capacitor to disable said integrating circuit and an open position actuating same, first and second input terminals for receiving first and second input signals of opposite polarities, a second switch having a first position connecting said first terminal to the input of said amplifier and a second position connecting said second terminal to the input of said amplifier, a zero level comparator coupled to the output of said amplifier for generating an output pulse in response to the amplifier output passing through zero level, a pulse counter having a digital output representative of a number of pulses applied to its input, said counter having a full scale output for generating a full scale indicating pulse in response to a full scale reading of said digital output, said counter having a reset input for setting said counter to a predetermined start count in response to energization of the reset input, a pulse generator for generating a series of pulses of equal time separation, an AND-gate having first and second inputs and an output, said first input of said AND-gate coupled in receiving relation to the output of said pulse generator, said output of said AND-gate connected to the input of said pulse counter, a flip-flop having a reset input, a second input, and an output, said reset input of said flip-flop coupled in receiving relation to the output of said comparator, said output of said flip-flop coupled in actuating relation to said first switch and to said second input of said AND-gate to actuate said first switch to its open position and open said gate in response to a pulse at the second input of said flip-flop, a second flip-flop having a reset input, a second input, and an output, said second input of said second flip-flop responsively coupled to said full scale output of said counter, said output of said second flip-flop coupled in actuating relation to said second switch to actuate the switch to its second position in response to said full scale indicating pulse and to actuate the switch to its first position in response to energization of the reset input of the second flip-flop, and start-reset means for energizing said reset inputs of said counter and second flip-flop just prior to energization of said second input of said first flip-flop.

14. A converter according to claim 13, wherein said predetermined starting count of said counter is midway between a zero count and full scale count thereof, the most significant digit of the count of said counter being zero or one.

No references cited.

DARYL W. COOK, *Acting Primary Examiner.*

J. WALLACE, *Assistant Examiner.*